US007333630B2

United States Patent
Song (10) Patent No.: US 7,333,630 B2
(45) Date of Patent: Feb. 19, 2008

(54) METHOD AND APPARATUS FOR DETECTING FILM IMAGE USING GROUPING

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 730 days.

(21) Appl. No.: 10/784,965

(22) Filed: Feb. 25, 2004

(65) Prior Publication Data

US 2004/0264740 A1  Dec. 30, 2004

(30) Foreign Application Priority Data

Jun. 14, 2003  (KR)  ...................... 10-2003-0038515

(51) Int. Cl.
*G06K 9/00* (2006.01)
(52) U.S. Cl. .................. 382/103; 382/219; 375/240.16
(58) Field of Classification Search ................ 382/103, 382/106, 107, 112, 168, 181, 190.199, 190, 382/199, 216, 232, 274, 276, 172, 184, 194, 382/200, 203, 219, 243, 260, 277, 287, 294–299, 382/305; 375/240.16, 240.18; 348/222.1; 352/6, 9, 12, 59
See application file for complete search history.

(56) References Cited

U.S. PATENT DOCUMENTS

| | | | | |
|---|---|---|---|---|
| 5,414,779 A | * | 5/1995 | Mitch ......................... | 382/199 |
| 5,923,779 A | * | 7/1999 | Ohmi et al. ................. | 382/190 |
| 6,442,203 B1 | * | 8/2002 | Demos ................... | 375/240.16 |
| 6,563,951 B2 | * | 5/2003 | Fåhraeus et al. ............ | 382/216 |
| 6,823,012 B2 | * | 11/2004 | Song ..................... | 375/240.16 |
| 7,139,019 B2 | * | 11/2006 | Kondo et al. ............ | 348/222.1 |

FOREIGN PATENT DOCUMENTS

| CN | 1116797 A | 2/1996 |
|---|---|---|
| KR | 10-2001-0026397 A | 4/2001 |

\* cited by examiner

*Primary Examiner*—Seyed Azarian
(74) *Attorney, Agent, or Firm*—Sughrue Mion, Pllc.

(57) ABSTRACT

Provided is a method and apparatus for determining whether an input mage is a film image. The method includes (a) receiving a predetermined number of similarity values of two adjacent fields of the same kind from an image having interlaced fields, (b) classifying the received similarity values into a first group and a second group, (c) converting the similarity values classified in the first group and the second group into values different from each other, and (d) determining whether the image is a film image according to a period of the converted values. Since input similarity values are classified using a grouping, a film image can be detected without setting a threshold value.

27 Claims, 7 Drawing Sheets

METHOD AND APPARATUS FOR DETECTING FILM IMAGE USING GROUPING

BACKGROUND OF THE INVENTION

This application is based on and claims priority from Korean Patent Application No. 2003-38515, filed on Jun. 14, 2003, in the Korean Intellectual Property Office, the disclosure of which is incorporated herein in its entirety by reference.

1. Field of the Invention

The present invention relates to image signal processing, and more particularly, to a method and apparatus for determining whether an input image is a film image.

2. Description of the Related Art

Images for films, televisions (TVs), digital video discs (DVDs) and so on have different frame structures. A film image has 24 progressive frames per second, while a TV or DVD video image has 60 interlaced fields per second. Therefore, to broadcast a film for display on a TV set, 24 progressive frames per second have to be converted into 60 interlaced fields per second. This conversion is made using a telecine operation. A 3:2 pull-down technique is employed during the telecine operation to convert film images into National Television System Committee (NTSC) TV images.

Figure 1:
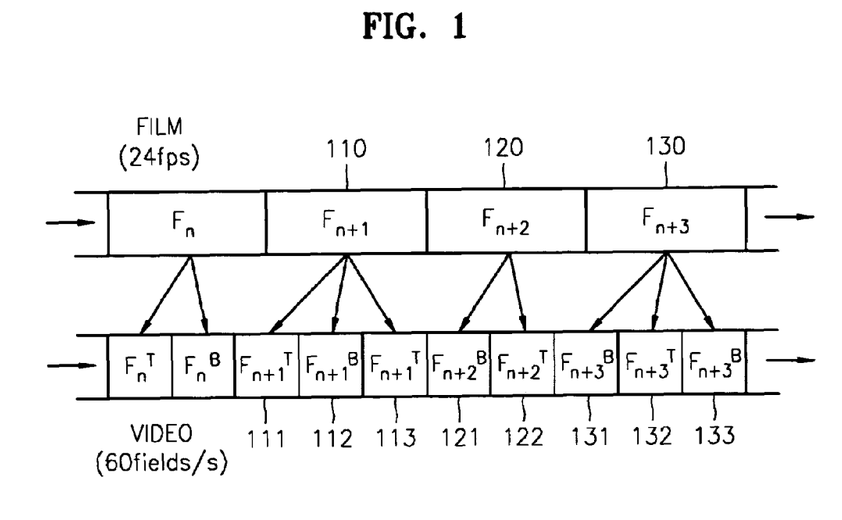
FIG. 1 is a diagram for explaining the conversion of 24 film frames per second into 60 fields per second using a 3:2 pull-down process.

FIG. 1 is a diagram for explaining the conversion of 24 film frames per second into 60 fields per second using a 3:2 pull-down process.

Referring to FIG. 1, a top field 111 and a bottom field 112 are first extracted from one frame 110. Thereafter, another top field 113 is extracted from the frame 110. Next, a bottom field 121 and a top field 122 are extracted from a next frame 120. Through this procedure, two progressive frames are converted into five interlaced fields. Alternatively, after a bottom field 131, a top field 132 and a bottom field 133 are extracted from a frame 130, a top field and a bottom field are extracted from a next frame. Similarly, two progressive frames can also be converted into five interlaced fields through this procedure.

Once film images are converted into 60 interlaced fields using the above-described 3:2 pull-down process, the interlaced fields can be converted into 60 progressive frames by combining top fields and bottom fields.

Figure 2:
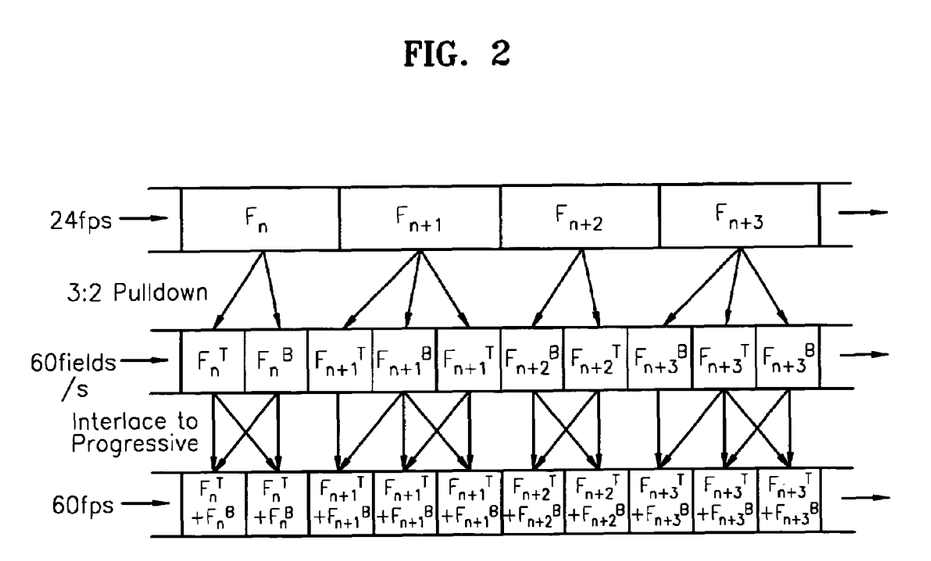
FIG. 2 is a diagram for explaining the conversion of an image having interlaced fields into an image having progressive frames.

FIG. 2 is a diagram for explaining the conversion of interlaced fields into progressive frames.

Images converted using the 3:2 pull-down process can be converted into progressive frames by combining top fields and bottom fields. In this case, an improved image quality can be obtained and a soft moving image can be obtained in a slow motion mode. Since films are stored at 24 frames per second, instead of 60 fields per second, a waste of storage space is prevented. However, different processing can be performed according to kinds of input images only after determining whether input images are images converted using the 3:2 pull-down technique or images having originally interlaced fields. Such a detection of characteristics of an image source is necessary not only for NTSC image signals but also for Phase Alternation Line (PAL) image signals and other types of image signals.

Conventional methods of determining whether received images are film images are divided into two methods according to the type of image information used in the determination process. A first method utilizes a pattern of a sum of absolute differences (SAD) between fields having the same characteristics calculated for every two-fields (one frame). More particularly, the first method is sub-divided into a variant which utilizes the fact that a period of values of the SAD is 5, and another variant which utilizes the fact that a period of difference signals between values of a current SAD and values of a previous SAD is 5 to obtain a SAD pattern having a higher periodicity.

A second method is to use the characteristics of a moving pattern between two fields. More particularly, the second method is sub-divided into a first variant which utilizes the fact that when a sum of motion vectors from blocks is added to a previously calculated sum, the result should be within a predetermined range, and a second variant of detecting a film image by obtaining a movement degree of a pixel, adding movement degrees of all the pixels to obtain a movement degree in the entire fields, converting a signal representative of the movement degree into a digital pattern, and comparing the converted pattern with a predetermined binary sequence of, for example, 100010.

However, neither of the conventional methods lead to patterns having an exact period. Furthermore, the conventional methods are disadvantageous in that a determination result of whether received images are film images varies depending on a threshold value, i.e., a reference value used during the conversion into digital patterns.

SUMMARY OF THE INVENTION

The present invention provides a method and apparatus for determining whether received images are film images without setting a threshold value using grouping.

The present invention provides a method and apparatus for determining whether received images are film images in an exacter manner by using motion vector information as well as values of the sum of absolute differences of fields.

According to an aspect of the present invention, there is provided a method of detecting a film image, comprising: (a) receiving a predetermined number of similarity values of two adjacent fields of the same kind from an image having interlaced fields; (b) classifying the received similarity values into a first group and a second group; (c) converting the similarity values included in the first group and the second group into different values from each other; and (d) determining whether the image is a film image according to a period of the converted values.

The similarity values may be the sum of absolute differences of the two adjacent fields of the same kind.

The similarity values may be the sum of magnitudes of motion vectors between the two adjacent fields of the same kind.

According to another aspect of the present invention, there is provided a method of detecting a film image, comprising: receiving a predetermined number of coordinate values consisting of the sum of absolute differences and motion vectors of fields constituting the film image; classifying the received coordinate values into a first group and a second group; converting the coordinate values included in the first group and the second group into different values from each other; and determining whether the image is a film image according to a period of the converted values.

According to still another aspect of the present invention, there is provided an apparatus for detecting a film image, comprising: a characteristic information receiving portion for receiving similarity values of two adjacent fields of the same kind from an image having interlaced fields; a grouping portion for grouping the similarity values; and an image determining portion for determining whether the image is a film image according to a period of output values converted into a binary pattern after a grouping.

According to yet another aspect of the present invention, there is provided a computer-readable recording medium having recorded thereon a program for executing the above image detection method in a computer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

In order to determine whether a received image is a film image, similarity information between fields of the same kind is used in an image having interlaced fields. That is to say, similarity information between adjacent top fields and similarity information between bottom fields are used. Examples of the similarity information include values of the sum of absolute differences (SAD), values of motion vectors, and mode information in motion estimation. However, the similarity information is not limited to these examples but can include any similarity information between fields of the same kind to which a grouping process according to the present invention can be applied.

Figure 3:
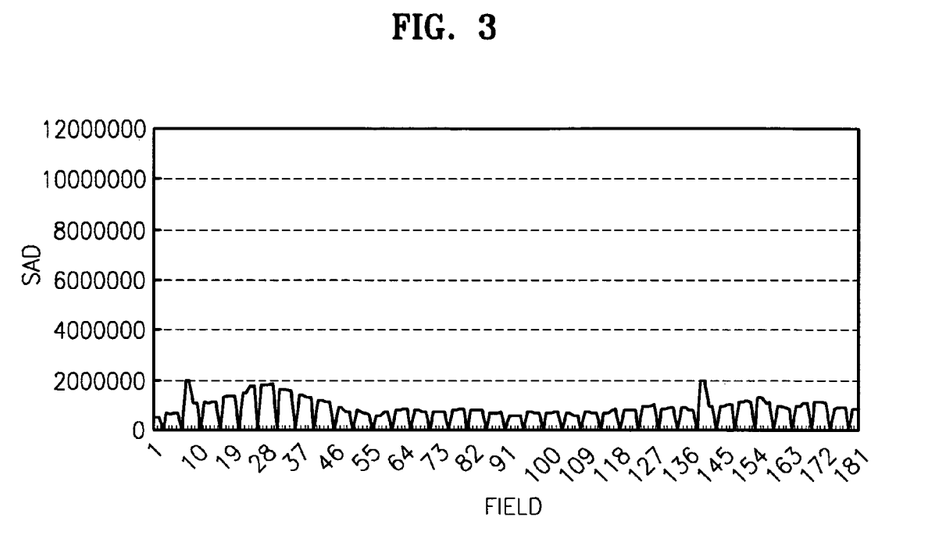
FIG. 3 is a diagram illustrating changes in values of the sum of absolute differences (SAD) according to fields.

FIG. 3 is a diagram illustrating changes in values of the SAD according to fields.

As shown in FIG. 1, when a frame divided into top fields and bottom fields is input, values of the SAD are calculated between the top fields and between the bottom fields. The SAD is a value obtained by summing all absolute values of differences in pixel values between fields. FIG. 3 shows that the calculated values of the SAD become periodically small. A period of the values of the SAD is determined by comparing a predetermined threshold value with the values of the SAD in a number W of fields including previous fields of a current field to obtain a binary pattern. Here, W is an arbitrary value. For example, when W is set to 10 in order to detect a film image, the values of the SAD in all 10 fields are checked and it is determined whether a value of the SAD near to 0 appears every five fields.

The period can be determined without using a threshold value by grouping the values of the SAD. A method of grouping the values of the SAD will be explained with reference to FIG. 4.

Figure 4:
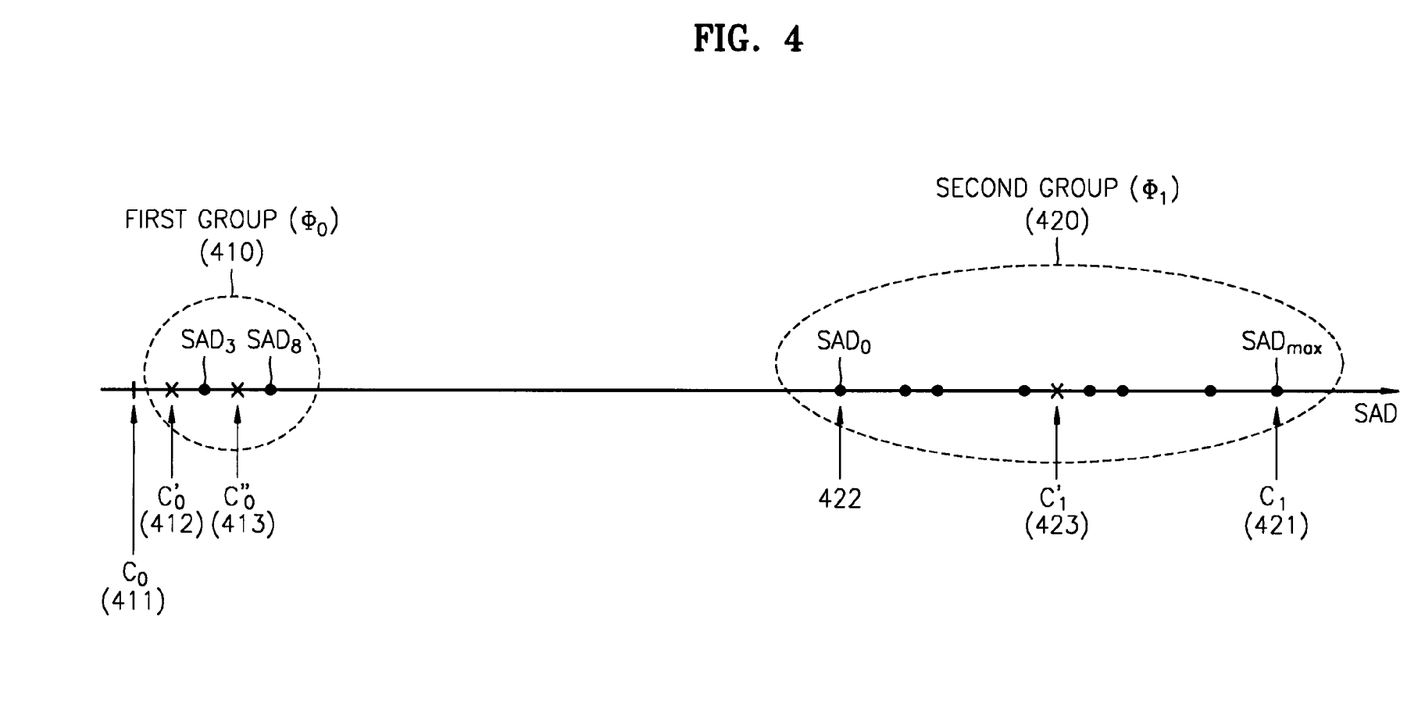
FIG. 4 is a diagram for explaining grouping of the values of the SAD.

FIG. 4 is a diagram for explaining grouping of the values of the SAD.

All the values of the SAD are classified into a first group 410 in which the SAD values are converted into 0 and into a second group 420 in which they are converted into 1, for example. When a period of the values of the SAD is determined by using 10 values of the SAD in the aforesaid example, the 10 SAD values are aligned on a one-dimensional surface. A central point $C_0$ (411) of the first group and a central point $C_1$ (412) of the second group are determined. The initial central point of the first group $C_0$ (411) is set to 0 and the initial central point of the second group $C_1$ (421) is set to $SAD_{max}$. The $SAD_{max}$ is set to a sufficiently large value.

Next, after one of the values of the SAD is received, a distance between a current position of the value of the SAD and the central point of each group is calculated. The value of the SAD is included in a group having the central point nearer to the value of the SAD, and the central point of the group in which the value of the SAD is included is updated. The central point is updated to a middle value between the original central point and the position of the value of the SAD. In the example of FIG. 4, since $SAD_0$ is nearer to $C_1$ 421, it is included in the second group 420, and the central point $C_1$ 421 of the second group 420 is updated to $C'_1$ 423. In this manner, it is determined in which group all the values of the SAD are included and the central points thereof are updated. The central point of the first group 410 is also moved to $C'_0$ 412 and to $C''_0$ 413 by $SAD_3$ and $SAD_8$. A process of updating the central points is presented in Equation 1.

$$C_0 = \frac{1}{n(\Phi_0)+1}[n(\Phi_0) \times C_0 + SAD_i], \quad \text{[Equation 1]}$$

$$C_1 = \frac{1}{n(\Phi_1)+1}[n(\Phi_1) \times C_1 + SAD_i],$$

where $SAD_i$ represent 10 values of the SAD, $\Phi_0$ and $\Phi_1$ respectively represent the first group and the second group, and $n(\Phi_0)$ and $n(\Phi_1)$ respectively represent the number of the values of the SAD included in the first group and the second group. The process of updating central points is repeated until all of the 10 values of the SAD are updated. After the process of updating central points is repeated several times, the central points are converged into specific values, and the number of the values of the SAD included in the each group is not changed. The grouping process can be performed with 10 values of the SAD as described above, and can also be performed using a larger number of values of the SAD.

After the values of the SAD are grouped, as shown in FIG. 4, when the image is a film image, $SAD_3$ and $SAD_8$ are included in the first group 410 and other values of the SAD are included in the second group 420. The values of the SAD included in the first group 410 are converted into 0, and the values of the SAD included in the second group 420 are converted into 1. If so, the values of the SAD can be converted into 0 or 1 without any threshold value, and a period can be determined based on a pattern of the converted values. Even when the values of the SAD included in the first group are converted into a value other than 0 and the values of the SAD included in the second group are converted into a value other than 1, the same periodical result can be obtained.

Figure 5:
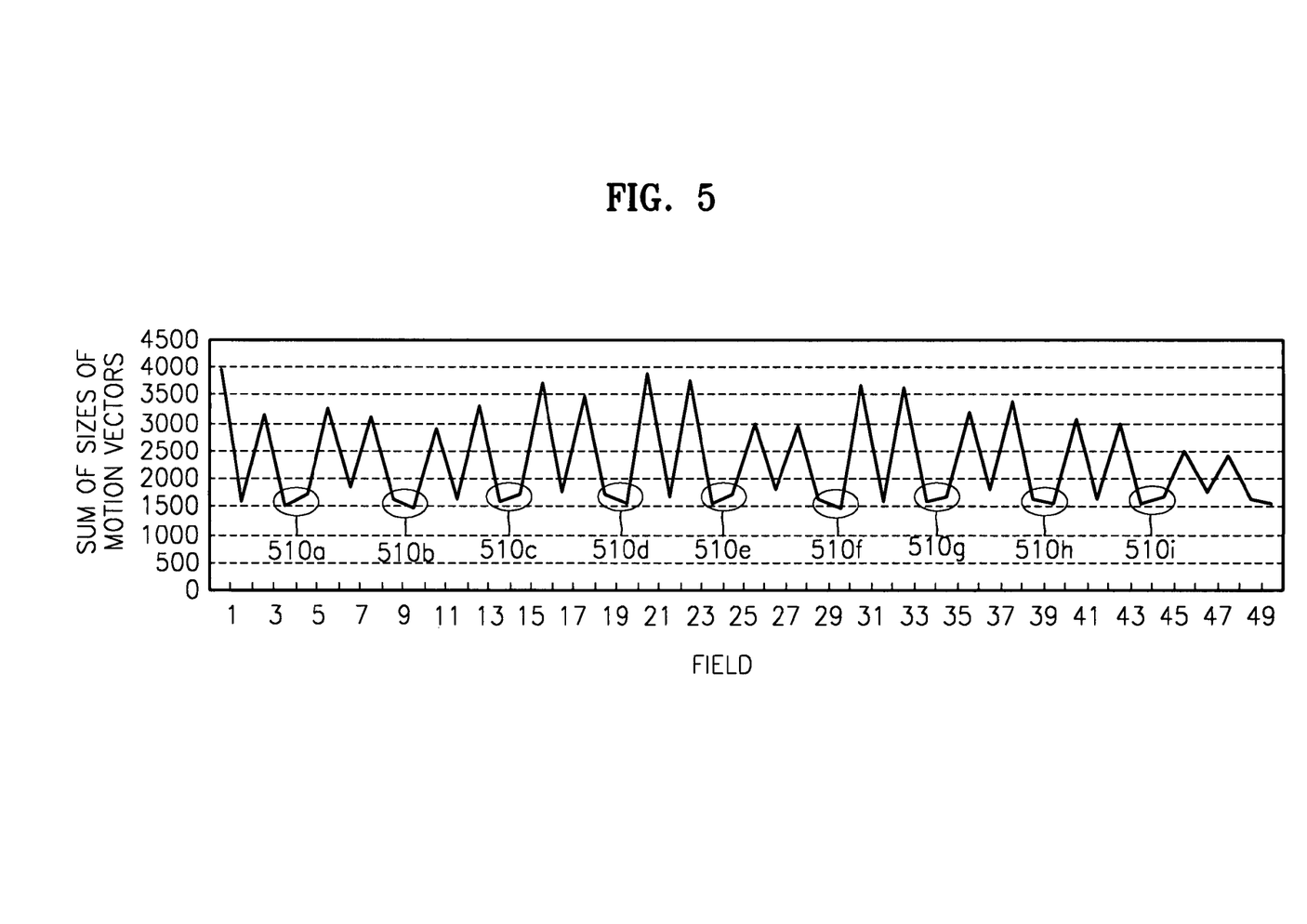
FIG. 5 is a diagram illustrating the sum of magnitudes of motion vectors.

FIG. 5 is a diagram illustrating the sum of magnitudes of motion vectors.

In case of a film image, values of the sum of magnitudes of motion vectors in a range from 510a to 510i in FIG. 5 are small. For example, when values of the sum of magnitudes of motion vectors in 10 fields are calculated and the values of the sum of magnitudes of motion vectors $M_i$ in two adjacent fields among previous 10 fields of a current field are aligned, two values among 10 values are small and other values are large. Thus, when the above-described grouping process is applied to the sum of magnitudes of motion vectors $M_i$, whether an input image is a film image can be determined.

Next, a two-dimensional grouping method will be explained. Here, information on values of the SAD and magnitudes of motion vectors are used together. FIG. 5 shows that the values of the sum of magnitudes of motion vectors between adjacent fields are periodically changed.

A two-dimensional grouping is performed using the values of the SAD $\{SAD_i, 0<=i<10\}$ and motion vectors $\{M_i, 0<=i<10\}$ with respect to 10 fields. That is, coo values (SAD, M) are grouped with each other as follows.

Figure 6:
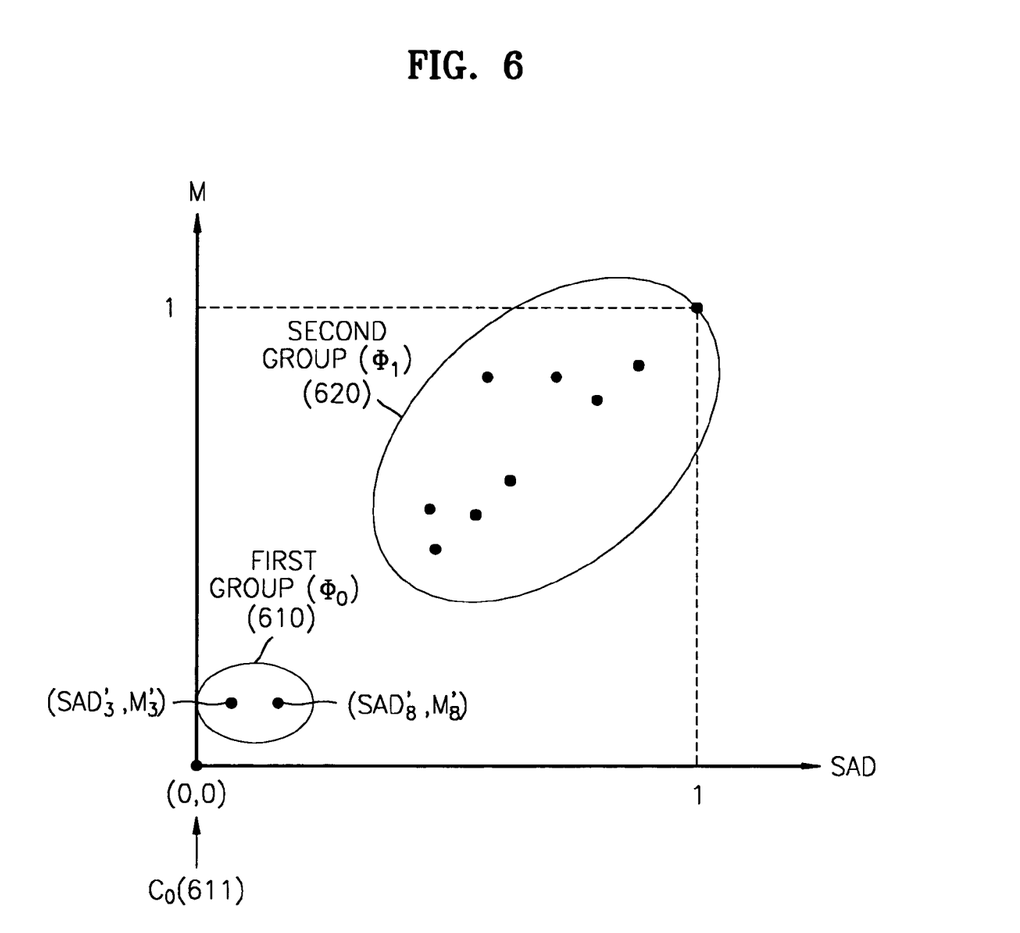
FIG. 6 is a diagram for explaining grouping of two-dimensional coordinate values.

First, a normalization process is performed. That is, a maximum value is found in the values of the SAD $\{SAD_i, 0<=i<10\}$, and a normalization is performed with regard to the maximum value. In other words, when a maximum value among $SAD_0, \ldots SAD_9$ is $SAD_{max}$, the values of the SAD are respectively divided by the $SAD_{max}$ to be normalized. As a consequence, normalized values of the SAD $\{SAD'_i, SAD'_i=SAD_i/SAD_{max}, 0<=i<10\}$ ca obtained. In the same manner, values of motion vectors are normalized. That is to say, a maximum value is found in the motion vectors $\{M_i, 0<=i<10\}$, and a normalization is performed with the maximum value. In other words, when a maximum value among $M_0, \ldots M_9$ is $M_{max}$, the values of the motion vectors are divided by the $M_{max}$ to be normalized. As a consequence, normalized motion vectors $\{M'_i, M'_i=M_i/M_{max}, 0<=i<10\}$ can be obtain FIG. 6 is a diagram for explaining grouping of two-dimensional coordinate values.

In the above-described example, when a period needs to be determined using 10 values of the SAD and the sum of magnitudes of motion vectors, 10 normalized coordinate values (SAD', M') are arranged on a two-dimensional coordinate system.

Next, initial central coordinating points $C_0$ (611) and $C_1$ (621) of a first group 610 and a second group 620 are respectively determined. For example, the central coordinating point $C_0$ (611) of the first group 610 can be set to (0, 0), and the central coordinating point $C_1$ (621) of the second group 620 can be set to (1, 1). After a distance between a position of the normalized coordinate value (SAD', M') and the central point of each group is checked, the normalized coordinate value (SAD', M') is included in a group nearer thereto, and a central point of the group in which the coordinate value is included is updated to a middle value between the original central point and the position of the normalized coordinate value (SAD', M') included in the group. That is to say, a central point is updated using the following Equation 2.

$$C_0 = \frac{1}{n(\Phi_0)+1}[n(\Phi_0) \times C_0 + (SAD'_i, M'_i)],$$ [Equation 2]

$$C_1 = \frac{1}{n(\Phi_1)+1}[n(\Phi_1) \times C_1 + (SAD'_i, M'_i)],$$

where $(SAD'_i, M'_i)$ represents 10 input normalized coordinates, $\Phi_0$ and $\Phi_1$ respectively represent the first group 610 and the second group 620, and $n(\Phi_0)$ and $n(\Phi_1)$ respectively represent the number of normalized coordinate values (SAD', M') included in the first group 610 and the second group 620. A central point updating process is repeated until all the 10 normalized coordinate values (SAD', M') are updated. After the central point updating process is repeated several times, central points are converged into specific values and the number of normalized coordinate values (SAD', M') included in each group is not changed. A grouping process can be performed using 10 normalized coordinate values (SAD', M') as described above, and can also be performed using a more number of normalized coordinate values (SAD', M').

Referring to FIG. 6, after the aforementioned grouping process is performed, when the input image is a film image, the normalized coordinate values $(SAD'_3, M'_3)$ and $(SAD'_8, M'_8)$ are included in the first group 610, and other normalized coordinate values (SAD', M') are included in the second group 620. The normalized coordinate values (SAD', M') included in the first group 610 are converted into 0, and the coordinate values (SAD', M') included in the second group 620 are converted into 1. Accordingly, the normalized coordinate values (SAD', M') can be converted into 0 or 1 without using any threshold values of SAD' and M'. A period of the coordinate values can be determined using the converted values.

Figure 7:
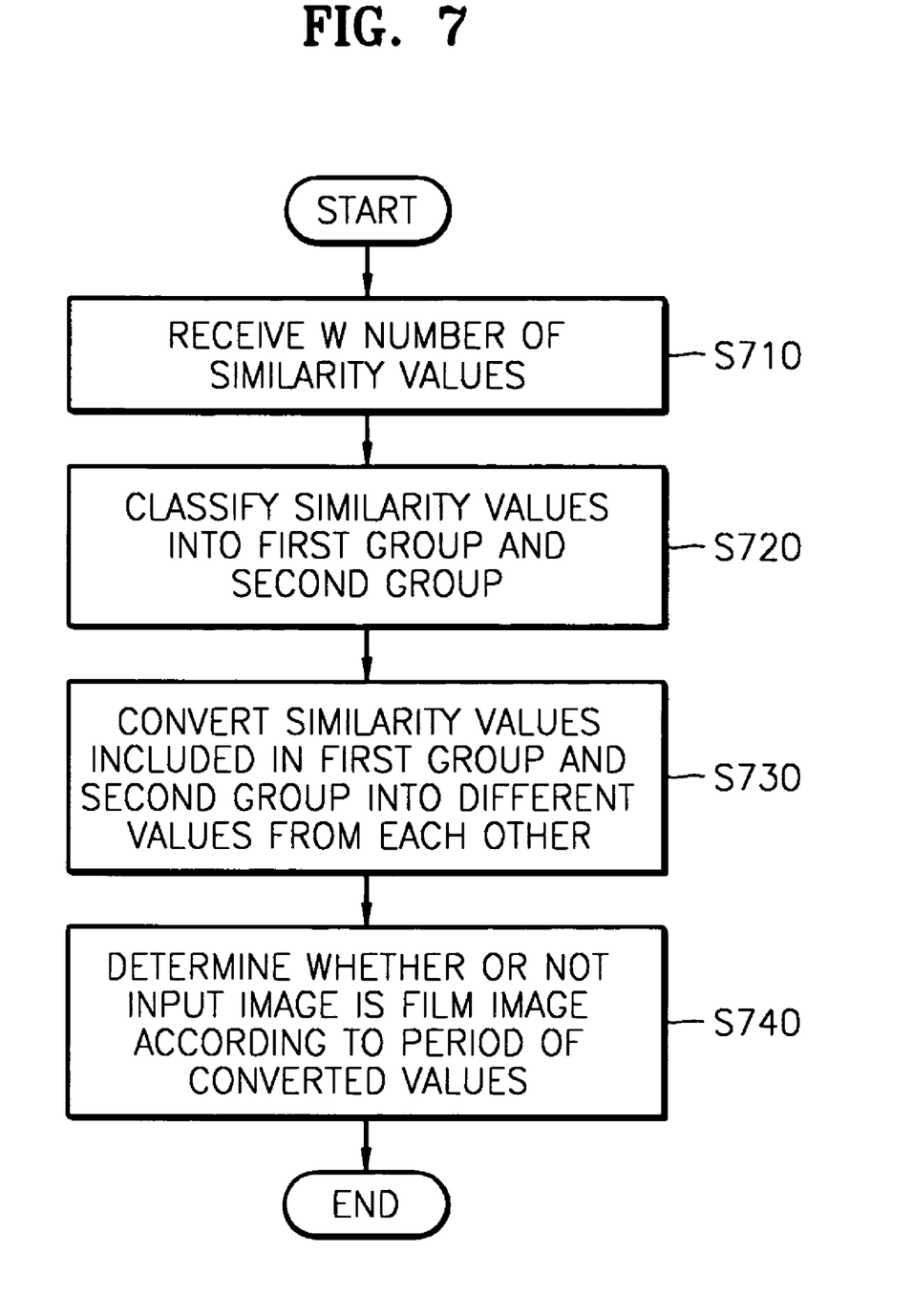
FIG. 7 is a flow chart illustrating a method of detecting a film image according to the present invention.

FIG. 7 is a flow chart illustrating a method of detecting a film image according to the present invention.

According to the method, in step S710, a predetermined number of uniformity information of fields constituting the image are received. Here, the uniformity information includes information on values of the SAD and on the sum of motion vectors, as described above. The predetermined number can be set arbitrarily. For example, the predetermined number can correspond to two times of a pattern period of the SAD or the sum of motion vectors. The values of the SAD are calculated using pixel values between two adjacent fields of the same kind.

Next, in step S720, the received similarity values are classified into a first group and a second group. That is, after the similarity values are read one by one, it is determined in which group the similarity values are included. A grouping process is the same as described with reference to FIG. 4.

Next, in step S730, the similarity values included in the first group and the similarity values included in the second group are converted into different values from each other. For example, all the similarity values included in the first group are converted into 0, and all the similarity values included in the second group are converted into 1. In step S740, it is determined whether the input image is a film image according to a period of the converted similarity values. When a pattern period of the similarity values is 5, the input image is determined to be a film image.

Figure 8:
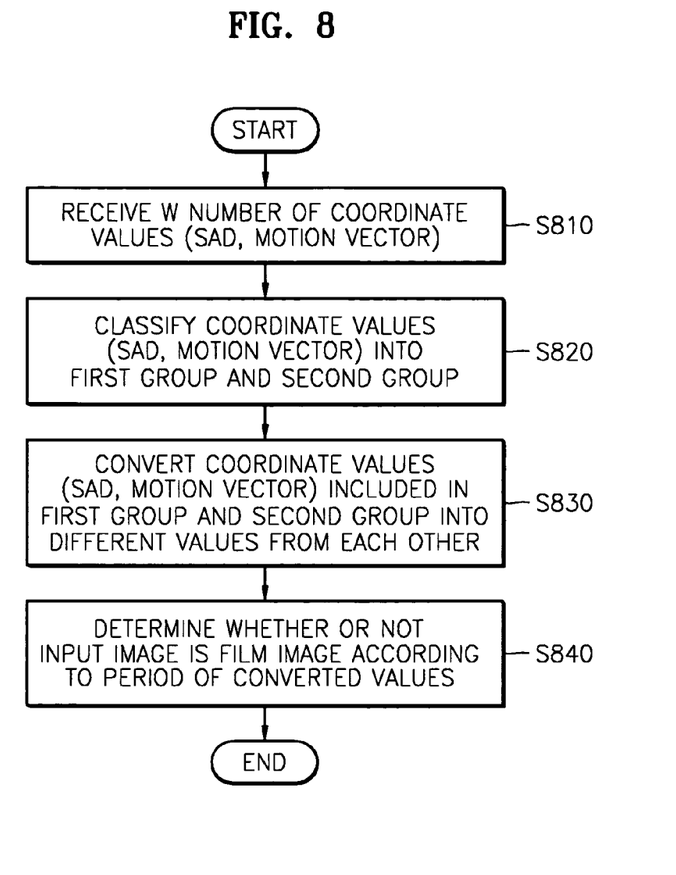
FIG. 8 is a flow chart illustrating a method of detecting a film image using a two-dimensional grouping process.

FIG. 8 is a flow chart illustrating a method of detecting a film image using a two-dimensional grouping process.

According to the method, in step S810, a predetermined number of coordinate values (SAD, M) of fields constituting the image are received. Here, the predetermined number is arbitrarily set. For example, the predetermined number can correspond to two times of a pattern period of the coordinate values (SAD, M). The coordinate values (SAD, M) can be used after being normalized with maximum values of the SAD and the motion vectors. A normalization process is the same as described above.

Next, in step S820, the received coordinate values (SAD, M) are classified into a first group and a second group. That is to say, after the coordinate values (SAD, M) are read one by one, it is determined in which group the coordinate values (SAD, M) are included. A grouping process is the same as described with reference to FIG. 6.

In step S830, the coordinate values (SAD, M) included in the first group and the coordinate values (SAD, M) included in the second group are converted into different values from each other. For example, all the coordinate values (SAD, M) included in the first group are converted into 0, and all the coordinate values (SAD, M) included in the second group are converted into 1. In step S840, it is determined whether the input image is a film image according to a period of the converted coordinate values (SAD, M). When a period of the coordinate values (SAD, M) is 5, the input image is determined to be a film image.

Figure 9:
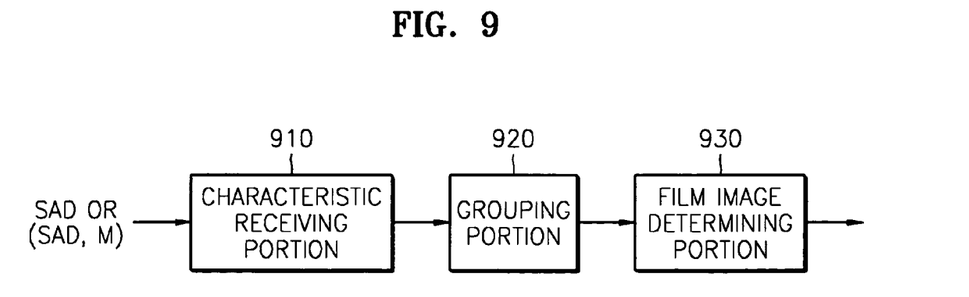
FIG. 9 is a block diagram of an apparatus for detecting a film image according to the present invention.

FIG. 9 is a block diagram of an apparatus of detecting a film image according to the present invention.

The film image detecting apparatus includes a characteristic information receiving portion 910, a grouping portion 920, and an image determining portion 930. The characteristic information receiving portion 910 receives similarity values of two adjacent fields of the same kind from an image having interlaced fields. For example, the characteristic information receiving portion 910 receives values of the SAD, values of the sum of motion vectors, or coordinate values (SAD, M). The characteristic information receiving portion 910 uses only the values of the SAD or the values of the sum of motion vectors to perform a one-dimensional grouping, and uses both the values of the SAD and the sum of motion vectors to perform a two-dimensional grouping.

The grouping portion 920 performs a grouping process using the values of the SAD value, the sum of motion vectors or the coordinate values (SAD, M). The one-dimensional grouping and the two-dimensional grouping are the same as described with reference to FIGS. 4 and 6. As a result of the grouping process, a binary pattern is output. The image determining portion 930 determines whether the image is a film image according to a period of output values converted into the binary pattern after the grouping. When a period of the binary pattern is equal to 5, the image is determined to be a film image.

The present invention can be realized as a computer-readable code on a computer-readable recording medium. Computer-readable recording mediums include all kinds of recording devices in which data readable by computer systems are stored. Computer-readable recording mediums include ROMs, RAMs, CD-ROMs, magnetic tapes, floppy discs, optical data storages, and so on. Furthermore, devices using a carrier wave, for example, transmission through the Internet can be included in the computer-readable recording mediums. Also, the computer-readable recording mediums can be distributed in computer systems connected through networks, such that the computer-readable codes can be stored and executed in the computer-readable recording mediums in a distributed manner.

As described above, since input similarity values are classified using a grouping, a film image can be easily detected without setting a threshold value.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting a film image, comprising:
(a) receiving a predetermined number of similarity values of two adjacent fields of the same kind from an image having interlaced fields;
(b) classifying the similarity values which are received into a first group and a second group;
(c) converting the similarity values classified in the first group and the similarity values classified in the second group into values different from each other; and
(d) determining whether the image is a film image according to a period of the converted values,
wherein the similarity values comprise values of a sum of absolute differences of differences between pixel values of the two adjacent fields of the same kind.

2. The method of claim 1, wherein the predetermined number in step (a) corresponds to two times of a pattern period of the sum of absolute differences.

3. The method of claim 1 wherein step (b) comprises:
(b1) aligning the values of the sum of absolute differences in a one-dimensional coordinate system;
(b2) setting a central point of the first group to 0, and a central point of the second group to a maximum value of the values of the sum of absolute differences;
(b3) comparing a distance between a position of a value of the sum of absolute differences and the central point of the first group with a distance between the position of the value of the sum of absolute difference and the central point of the second group, and classifying the value of the sum of absolute differences to a group in which the position of the central point is nearest to the position of the value of the sum of absolute differences;
(b4) updating the central point of the group in which the value of the sum of absolute differences is classified; and
(b5) repeating steps (b3) and (b4) for additional values of the sum of absolute differences until the number of the values of the sum of the absolute differences classified in the first group and the second group is not changed.

4. The method of claim 3, wherein in step (b4), the central point of the group in which the value of the sum of absolute differences is classified is updated to a central value between the original central point and an added value of the sum of absolute differences.

5. The method of claim 3, wherein in step (b4), the central point is updated using the following equation:

$$C_0 = \frac{1}{n(\Phi_0) + 1}[n(\Phi_0) \times C_0 + SAD_i]$$

$$C_1 = \frac{1}{n(\Phi_1) + 1}[n(\Phi_1) \times C_1 + SAD_i],$$

where $C_0$ represents the central point of the first group, $C_1$ represents the central point of the second group, $SAD_i$ represents the predetermined number of values of the sum of absolute differences, $\Phi_0$ and $\Phi_1$ respectively represent the first group and the second group, and $n(\Phi_0)$ and $n(\Phi_1)$ respectively represent the number of the values of the sum of absolute differences classified in the first group and the second group.

6. The method of claim 1, wherein in step (c), all of the values of the sum of absolute differences classified in the first group are converted into 0, and all the values of the sum of absolute differences classified in the second group are convened into 1.

7. A method of detecting a film image, comprising:
(a) receiving a predetermined number of similarity values of two adjacent fields of the same kind from an image having interlaced fields;
(b) classifying the similarity values which are received into a first group and a second group;
(c) convening the similarity values classified in the first group and the similarity values classified in the second group into values different from each other; and
(d) determining whether the image is a film image according to a period of the convened values
wherein the similarity values are values of a sum of magnitudes of motion vectors between the two adjacent fields of the same kind.

8. The method of claim 7, wherein the predetermined number in step (a) corresponds to two times of a pattern period of the sum of magnitudes of motion vectors.

9. The method of claim 7, wherein step (b) comprises:
(b1) aligning the values of the sum of magnitudes of motion vectors in a one-dimensional coordinate system;
(b2) setting a central point of the first group to 0 and a central point of the second group to a maximum value among the values of the sum of magnitudes of motion vectors;
(b3) comparing a distance between a position of a value of the sum of magnitudes of motion vectors and the central point of the first group with a distance between the position of the value of the sum of magnitudes of motion vectors and the central point of the second group, and classifying the value of the sum of magnitudes of motion vectors to a group in which the position of the central point is nearest to the position of the value of the sum of magnitudes of motion vectors;
(b4) updating the central point of the group in which the value of the sum of magnitudes of motion vectors is classified; and
(b5) repeating steps (b3) and (b4) for additional values of the sum of magnitudes of motion vectors until the number of the values of the sum of magnitudes of motion vectors classified in the first group and the second group is not changed.

10. The method of claim 9, wherein in step (b4), the central point of the group in which the value of the sum of magnitudes of motion vectors is classified is updated to a middle value between the original central point and an added value of the sum of magnitudes of motion vectors.

11. A method of detecting a film image, comprising:
(a) receiving a predetermined number of coordinate values consisting of the sum of absolute differences and motion vectors of fields of an image;
(b) classifying the coordinate values which are received into a first group and a second group;
(c) converting the coordinate values classified in the first group and the second group into values different from each other; and
(d) determining whether the image is a film image according to a period of the convened values,
wherein the image in step (a) has interlaced fields.

12. The method of claim 11, wherein the coordinate values consisting of the sum of absolute differences and the motion vectors are normalized using maximum values of the sum of absolute differences and the motion vectors.

13. The method of claim 11, wherein the predetermined number of the coordinate values consisting of the sum of absolute differences and the motion vectors in step (a) corresponds to two times of a pattern period of the coordinates.

14. The method of claim 11, wherein step (b) comprises:
(b1) aligning the coordinate values consisting of the sum of absolute differences and the motion vectors in a two-dimensional coordinate system;
(b2) setting a central point of the first group to (0, 0) and a central point of the second group to (1, 1);
(b3) comparing a distance between a position of a coordinate value consisting of the sum of absolute differences and the motion vectors and the central point of the first group with a distance between the position of the coordinate value consisting of the sum of absolute differences and the motion vectors and the central point of the second group, and classifying the coordinate value consisting of the sum of absolute differences and the motion vectors to a group in which the position of the central point is nearest to the position of the coordinate value consisting of the sum of absolute differences and the motion vectors;
(b4) updating the central point of the group in which the coordinate value consisting of the sum of absolute differences and the motion vectors is classified; and
(b5) repeating steps (b3) and (b4) for additional coordinate values until the number of the coordinate values consisting of the sum of absolute differences and the motion vectors classified in the first group and the second group is not changed.

15. The method of claim 14, wherein in step (b4), the central point of the group in which the coordinate value consisting of the sum of absolute differences and the motion vectors is classified is updated to a middle value between the original value and an added coordinate value consisting of the sum of absolute differences and the motion vectors.

16. The method of claim 14, wherein in step (b4), the central point is updated using the following equation:

$$C_0 = \frac{1}{n(\Phi_0)+1}[n(\Phi_0) \times C_0 + (SAD'_i, M'_i),]$$

$$C_1 = \frac{1}{n(\Phi_1)+1}[n(\Phi_1) \times C_1 + (SAD'_i, M'_i)],$$

where $C_0$ represents the central point of the first group, $C_1$ represents the central point of the second group, $(SAD'_i, M'_i)$ represents the input predetermined number of coordinate values consisting of the sum of absolute differences and the motion vectors, $\Phi_0$ and $\Phi_1$ respectively represent the first group and the second group, and $n(\Phi_0)$ and $n(\Phi_1)$ respectively represent the number of the values of the sum of absolute differences and the motion vectors classified in the first group and the second group.

17. The method of claim 11, wherein in step (c), all of the coordinate values consisting of the sum of absolute differences and the motion vectors classified in the first group are converted into 0, and all the coordinate values consisting of the sum of absolute differences and the motion vectors classified in the second group are convened into 1.

18. An apparatus for detecting a film image, comprising:
a characteristic information receiving portion for receiving similarity values of two adjacent fields of the same kind from an image having interlaced fields;
a grouping portion for grouping the similarity values received by the characteristic information receiving portion; and
an image determining portion for determining whether the image is a film image according to a period of output values converted into a binary pattern after grouping
wherein the similarity values are a sum of absolute differences meaning differences between pixel values of the two adjacent fields of the same kind.

19. An apparatus for detecting a film image, comprising:
a characteristic information receiving portion for receiving similarity values of two adjacent fields of the same kind from an image having interlaced fields;
a grouping portion for grouping the similarity values received by the characteristic information receiving portion; and
an image determining portion for determining whether the image is a film image according to a period of output values converted into a binary pattern after grouping,
wherein the similarity values are a sum of magnitudes of motion vectors of the two adjacent fields of the same kind.

20. The apparatus of claim 18, wherein the similarity values are coordinate values obtained using information regarding the sum of absolute differences and information regarding the sum of motion vectors.

21. The apparatus of claim 20, wherein the coordinate values consisting of the sum of absolute differences and the motion vectors are normalized with respect to maximum values of the sum of absolute differences and the motion vectors.

22. A computer-readable recording medium having recorded thereon a program for executing an image detection method in a computer, the method comprising:
(a) receiving a predetermined number of similarity values of two adjacent fields of the same kind from an image having interlaced fields;
(b) classifying the similarity values which are received into a first group and a second group;
(c) converting the similarity values classified in the first group and the second group into values different from each other; and
(d) determining whether the image is a film image according to a period of the converted values,
wherein the similarity values comprise values of a sum of absolute differences of differences between pixel values of the two adjacent fields of the same kind.

23. A computer-readable recording medium having recorded thereon a program for executing an image detection method in a computer, the method comprising:
(a) receiving a predetermined number of coordinate values consisting of a sum of absolute differences and motion vectors of fields constituting an image;
(b) classifying the coordinate values consisting of a sum of absolute differences and the motion vectors into a first group and a second group;
(c) converting the coordinate values consisting of the sum of absolute differences and the motion vectors classified in the first group and the second group into values different from each other; and
(d) determining whether the image is a film image according to a period of the converted values,
wherein the image in step (a) has interlaced fields.

24. The method for detecting a film image according to claim 1 wherein the detecting occurs without setting a threshold using grouping.

25. The method for detecting a film image according to claim 11 wherein the detecting occurs without setting a threshold using grouping.

26. The apparatus for detecting a film image according to claim 18 wherein the detecting occurs without setting a threshold using grouping.

27. A computer-readable recording medium having recorded thereon a program for executing an image detection method in a computer, the method comprising:
(a) receiving a predetermined number of similarity values of two adjacent fields of the same kind from an image having interlaced fields;
(b) classifying the similarity values which are received into a first group and a second group;
(c) converting the similarity values classified in the first group and the second group into values different from each other; and
(d) determining whether the image is a film image according to a period of the converted values,
wherein the similarity values are values of a sum of magnitudes of motion vectors between the two adjacent fields of the same kind.

* * * * *